United States Patent [19]

Röttenbacher

[11] Patent Number: 4,499,360
[45] Date of Patent: Feb. 12, 1985

[54] METHOD OF BRAZING SILICON CARBIDE PARTS USING SI-CO SOLDER

[75] Inventor: Reinhard Röttenbacher, Meersburg, Fed. Rep. of Germany

[73] Assignee: Dornier System GmbH, Friedrichshafen, Fed. Rep. of Germany

[21] Appl. No.: 513,020

[22] Filed: Jul. 12, 1983

[30] Foreign Application Priority Data

Aug. 14, 1982 [DE] Fed. Rep. of Germany ......... 323032

[51] Int. Cl.$^3$ .............................................. B23K 1/02
[52] U.S. Cl. .................................. 219/85 H; 420/578; 228/263.12; 204/192 C
[58] Field of Search ................ 420/578; 228/121, 198, 228/263.11, 263.12, 254, 248; 219/85 H, 85 CM, 137 WM, 146.22; 204/192 C

[56] References Cited

FOREIGN PATENT DOCUMENTS 1310997  9/1970  United Kingdom ................ 228/121

OTHER PUBLICATIONS

Shunk, Constitution of Binary Alloys, 1969, by McGraw-Hill, Inc., p. 264.

Primary Examiner—L. Dewayne Rutledge
Assistant Examiner—Debbie Yee
Attorney, Agent, or Firm—Ralf H. Siegemund

[57] ABSTRACT

A high-temperature reaction solder, for silicon carbide materials, containing 20–45% cobalt and 80–55% silicon by weight, and a process for brazing are disclosed.

8 Claims, 1 Drawing Figure

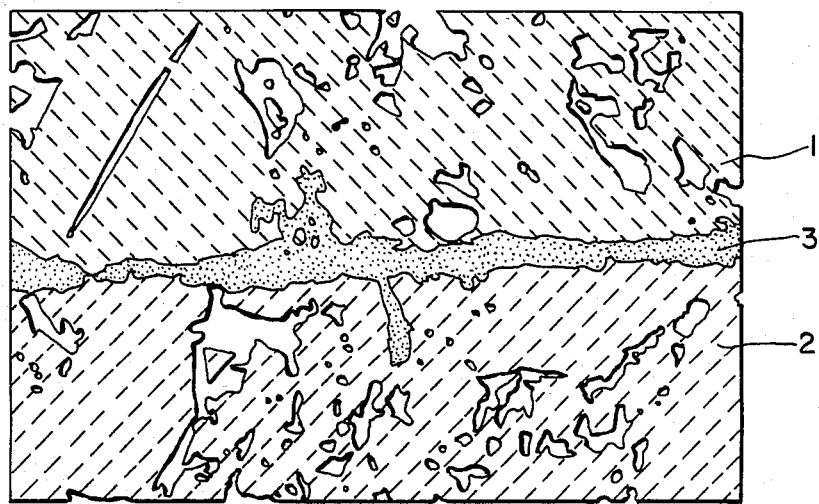

METHOD OF BRAZING SILICON CARBIDE PARTS USING SI-CO SOLDER

This invention relates to a solder and a process for bonding components made of silicon-impregnated silicon carbide, reaction-bound silicon carbide or sintered silicon carbide.

Impregnated or reaction-bound silicon carbide is a ceramic composite material of silicon carbide (SiC) and metallic silicon (Si). The proportion of metallic silicon may be up to 30% by volume.

The requirements placed on the bonding site are mechanical strength, extensive freedom from pores, impermeability to gases and resistance to corrosion, in particular to oxidation. These requirements must be met at temperatures in excess of 1,200° C.

As ceramics are brittle and practically lack any plastic deformability even at high temperatures, the thermal expansion coefficient must be carefully matched to that of the bondable ceramics.

A process for producing SiC-ceramic bonds by diffusion welding is known (German Offenlegungsschrift No. 3,003,186). This process has the drawback of high costs determined by the necessary high surface quality of the surfaces to be bonded and especially by the relatively long times for diffusion welding. Another drawback is the high compression which must be applied in diffusion welding. Therefore, components of complex shapes cannot be bonded, or can be only when use is made of extensive equipment.

The high temperature soldering of reaction-bound silicon carbide impregnated with silicon is known (British Pat. No. 1,315,319). In this procedure, silicon, together with additions of germanium, titanium, chromium, iron or nickel is used to lower the melting point. Essentially these solders react only with the free silicon in SiSiC (maximum Si content is 30%) and the strength of the bond is less than 10% that of the base material. Moreover, long soldering times (up to 16 h) are required in part to achieve that strength.

It is the object of the present invention to provide an economically advantageous process which is as simple as possible in application to bond parts made of silicon carbide materials, and to provide a suitable bonding agent. These bonds must evince adequate strengths up to temperatures in excess of 1200° C., be gas-tight, resistant to temperature cycles, and to corrosion, especially to oxidation.

This problem is solved by the invention by a solder for high temperature reaction brazing composed of 20 to 45% cobalt and 80 to 55% silicon by weight.

A lowering of the melting point takes place in the cobalt/silicon system, whereby it becomes possible to operate with the SiSiC material at temperatures below the melting point of the silicon component. During soldering, silicon and cobalt react with each other to form an alloy of low melting point. The melt reacts with the silicon from the base material, whereby an alloy is obtained which is richer in silicon and of higher melting point. Additionally, the cobalt reacts with the silicon carbide. The cobalt attacks the surface of the silicon carbide and ensures good serration between the solder and the base material so that reaction-soldering takes place from which good bonding strengths may be expected.

Active metals such as titanium, chromium or zirconium can be added to the cobalt-silicon solder, so that thereby the melting temperature is lowered further and the reaction between the solder and the base material is enhanced. Again, carbon can be added to the cobalt-silicon solder. During brazing, the solder reacts with all the components in the base material (Si and SiC) and part of the silicon reacts with the carbon to form a very finely dispersed new silicon carbide, so that the same bonding type as in the base material occurs in the bonding site. Because cobalt does not form stable carbides, no heterogeneous carbide is formed whereby the bond properties would be impaired.

The surfaces of the parts to be combined are provided with a coating of the solder powder, placed upon each other and slightly compressed. By applying high temperatures (not to exceed 1400° C.) in a short time span (no more than 30 minutes), the workpieces are brazed together.

Using a cobaltic solder is not obvious to the expert who must expect the cobalt to form an intermetallic $CoSi_2$ phase with the silicon, impairing the bond properties.

Surprisingly, however, it was found that by the slight compression in accordance with the present invention, it is precisely the cobalt which is extensively forced out of the bonding site. Very little cobalt remains in the bonding site.

Silicon oxidizes in air at the surface thereof while forming a closed layer of $SiO_2$ on that surface. This layer formation must be prevented during the process of the present invention because it would prevent the solder from reacting with the base material or, at the very least, it would make it more difficult. Therefore, the process preferably is carried out in vacuum or under a protective gas. Where the process times are sufficiently short, the bonding also can be performed in air.

Several implementing modes are available to deposit the intermediate layer in accordance with the invention:

The powder of the above-described composition is suspended in an organic solvent and an oily substance, and the suspension is deposited by a paint spraying method.

The metal compounds or the metal compounds mixed with carbon are deposited on the parts to be bonded.

The metal compounds are thermally decomposed in the absence of oxygen, whereby very finely distributed metals are produced.

The metals can be deposited by evaporation.

The metals can be sputter-deposited.

The metals can be deposited electrolytically.

The heat required for bonding can be generated in various ways:

The bonding site is heated inductively by means of an HF coil of such a geometry that the heat is focused on the bonding site. Using the electrical conductivity of the SiC components, these can act as susceptances, or a graphite susceptance is employed.

The bonding site is heated by an electric resistance oven.

The bonding site is heated by means of a hot protective gas.

The heating takes place directly by electric resistance heating.

The voltage is applied by sleeves to the parts to be bonded. The current, and hence the heating, occurs only at the contact sites of the bonding surfaces.

The process of the invention offers the following advantages:

simple and rapid implementation;

low expenditure in preparation of the soldering site; good properties of the bonding site.

The solder of the invention provides mechanically stable, helium-tight bonds. The maximum temperature of application of the joined component is the same as that of the base material and is not limited by the bonding site. The bonding site evinces the same good resistance to temperature cycles as the base material. The oxidation behavior of the bonding site is the same as that of the base material.

Bending tests have shown that two SiSiC pipes brazed in conformity with the invention do not rupture at the bonding site, but next to it.

Further advantages and features can be noted in the accompanying drawing which shows a connection of two pipes in accordance with the invention.

FIG. 1 is a photomicrograph of the bonding site between the two pipes 1 and 2 magnified ×1,200. The solder layer 3 is 5 to 10 microns thick, extensively free of pores, and is single-phase. The connection 3 is performed by the solder and the silicon of the base material (light). The SiC grains (dark) are attacked at the bonding site and roughened, thereby improving the adhesion to the solder.

The invention is further illustrated below by means of an embodiment.

The end surfaces of two pipes to be connected (pipe dimensions: outside diameter=50 mm, inside diameter=40 mm, length=500 mm) and made of reaction-bound and silicon-impregnated silicon carbide (SiSiC) are cut flat. A suspension of cobalt powder and silicon powder (35:65% by weight) is sprayed on these end surfaces. The layer thickness is about 200 microns. After drying, the prepared pipe end surfaces are placed against each other and slightly compressed in the axial direction. The bond is heated in a protective gas atmosphere in a resistance heater oven. The hot zone extends to 10 to 15 cm on each side of the bonding site. The temperature is maintained at 1,380° C. for about 20 minutes.

Following brazing, the solder layer is 5 to 10 microns thick, and excess solder has been forced out to the rim. The pipe connection is mechanically strong and helium-tight.

It will be obvious to those skilled in the art that many modifications may be made within the scope of the present invention without departing from the spirit thereof, and the invention includes all such modifications.

What I claim is:

1. A process for the high-temperature reaction brazing of parts made of silicon carbide materials employing a solder consisting essentially of 20–45% cobalt and 80–55% silicon, by weight, which comprises depositing said solder on at least one of said parts, compressing said parts together, and heating.

2. A process according to claim 1, in which said solder is deposited by spraying in powder form.

3. A process according to claim 1, in which said solder is deposited by thermal decomposition.

4. A process according to claim 1, in which said solder is deposited by reduction of metal compounds.

5. A process according to claim 1, in which said solder is deposited by sputtering.

6. A process according to claim 1, in which said solder is deposited by evaporation.

7. A process according to claim 1, in which said solder is deposited electrolytically.

8. A process according to claim 1, in which heating is effected by passing electric current through said compressed parts.

* * * * *